United States Patent [19]

Bouley

[11] Patent Number: 5,402,902
[45] Date of Patent: Apr. 4, 1995

[54] WALL OUTLET BOX EXTENSION

[76] Inventor: Roger R. Bouley, Rte. #2 Box 2245, Litchfield, Me. 04350

[21] Appl. No.: 154,491

[22] Filed: Nov. 19, 1993

Related U.S. Application Data

[63] Continuation-in-part of Ser. No. 959,640, Oct. 13, 1992, abandoned.

[51] Int. Cl.⁶ .............................................. H02G 3/12
[52] U.S. Cl. ...................................... 220/3.2; 220/3.7
[58] Field of Search ................................. 220/3.7, 3.2

[56] References Cited

U.S. PATENT DOCUMENTS

| | | | |
|---|---|---|---|
| 2,297,862 | 10/1942 | Buchmann | 220/3.7 X |
| 2,378,861 | 6/1945 | Peevey | 220/3.7 |
| 2,989,206 | 6/1961 | McAfee | 220/3.7 |
| 3,525,450 | 8/1970 | Payson | 220/3.7 |
| 3,651,245 | 3/1972 | Moll | 220/3.7 X |
| 3,689,864 | 9/1972 | Glader | 339/14 R |
| 3,878,315 | 4/1975 | Blush | 220/3.7 X |
| 3,955,701 | 5/1976 | Fisch | 220/3.7 |
| 4,599,485 | 7/1986 | Smolik | 220/3.7 X |
| 4,634,015 | 1/1987 | Taylor | 220/3.7 |
| 4,927,039 | 5/1990 | McNab | 220/3.7 |
| 5,042,673 | 8/1991 | McShane | 220/3.7 |
| 5,117,996 | 6/1992 | McShane | 220/3.7 |

Primary Examiner—Steven M. Pollard
Attorney, Agent, or Firm—Richard C. Litman

[57] ABSTRACT

An extension device for use in mounting electrical devices flush with a finished surface of a new wall covering which has been installed over an existing wall covering is disclosed. The extension device abuts an existing electrical box to isolate the electrical device from its surrounding environment. The extension device include a rectangular ring formed by a plurality of peripheral walls. A peripheral flange extends inwardly from the peripheral walls. The peripheral flange provides an abutment surface for engaging the front of the existing electrical box. Upper and lower inwardly directed formations, respectively, extend inwardly from the upper and lower peripheral walls. The inwardly directed formations are provided with openings which are oriented so as to be permitted to align with the threaded apertures in an existing electrical box. The extension device is secured between an electrical device and a respective electrical box. The extension device is held in abutment with the electrical box by fastening the electrical device to the electrical box.

7 Claims, 3 Drawing Sheets

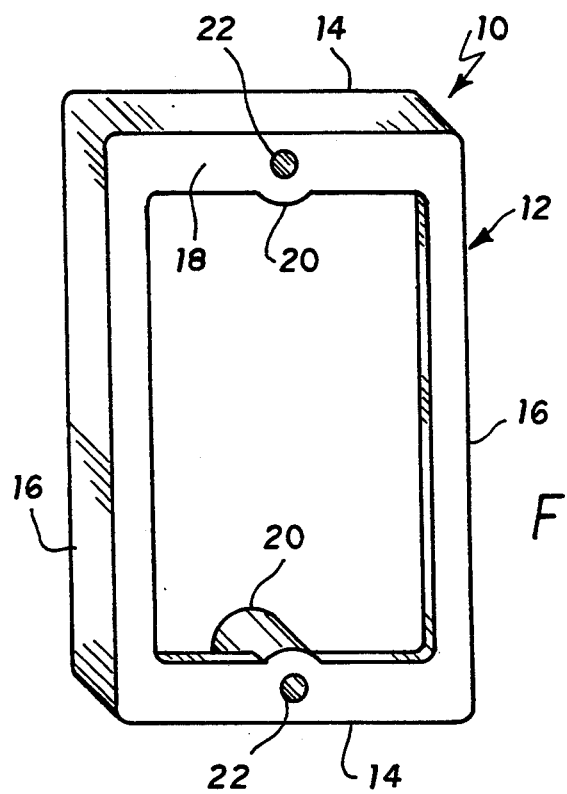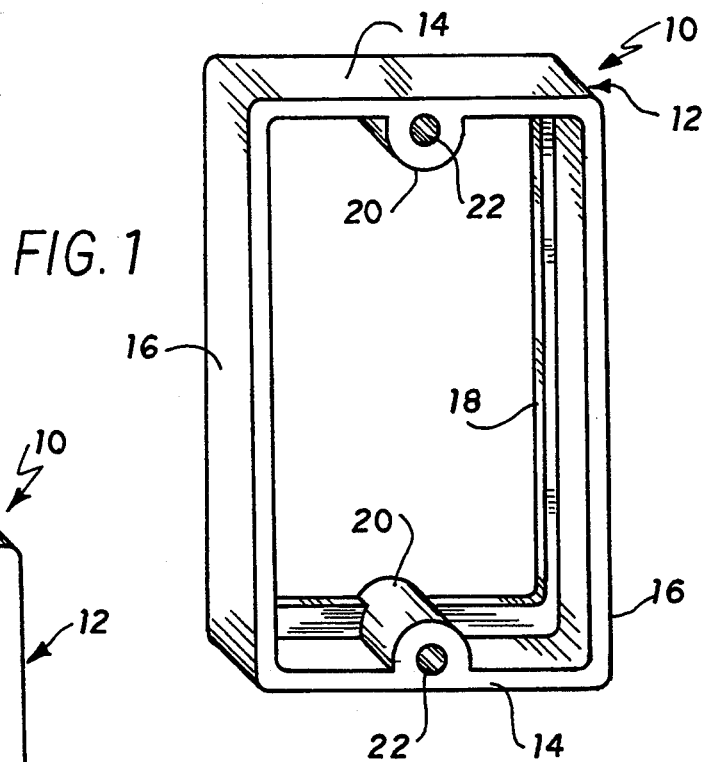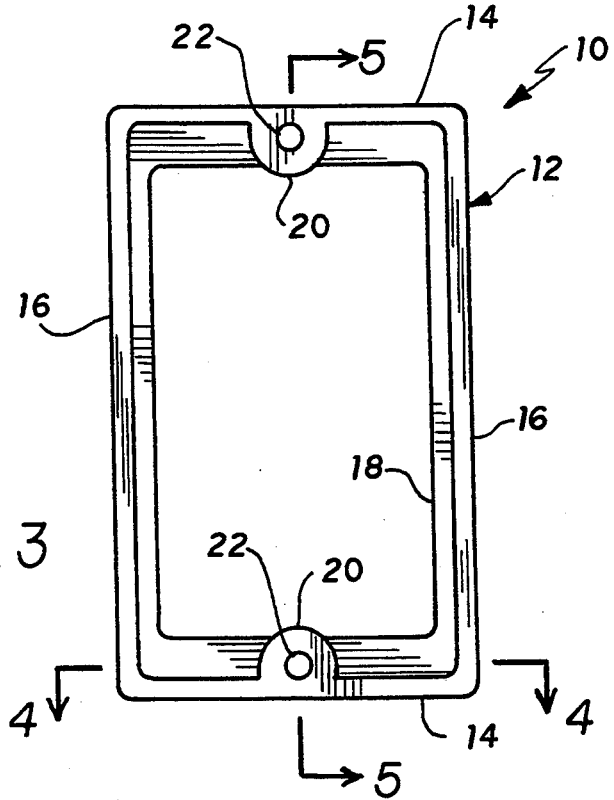

WALL OUTLET BOX EXTENSION

This is a continuation-in-part of application Ser. No. 07/959,640, filed on Oct. 13, 1992, abandoned.

BACKGROUND OF THE INVENTION

1. Field of the Invention

The present invention relates to a wall outlet box extension or an extension for use with existing electrical boxes. Such an extension would be ideal when a new surface, such as drywall or paneling, has been installed over an existing surface.

2. Description of the Prior Art

Electrical boxes are used in electrical construction to isolate electrical devices and the circuitry associated therewith from a surrounding environment. A single gang electrical box (5) of metallic construction is shown in U.S. Pat. No. 2,378,861, issued Jun. 19, 1945 to Lafayette H. Peevey. A two-gang electrical box (10) is shown in U.S. Pat. No. 2,989,206, issued Jun. 20, 1961 to R. F. McAfee. An electrical box constructed of phenolic resin or similar insulation hard plastic material is shown in U.S. Pat. No. 3,119,895 issued Jan. 28, 1964 to Lewis E. Palmer. During the course of new construction, electrical boxes such as these are permanently mounted to the building structure so as to extend flush with the finished surface of the wall.

When rehabilitating or remodeling a building, it is often desirable to install a new wall covering or surface over an existing wall covering or surface as opposed to removing and replacing the existing surface. Holes are easily cut in the new wall covering which align with existing electrical boxes. However, when the installation of the new wall covering is completed, the existing electrical boxes no longer extend flush with the finished surface thereof but are set back within the finished surface. This poses a problem. In order to meet National Electrical Codes, the electrical boxes must extend flush with the new finished surface. Moving the electrical boxes is time consuming and hence, not a practical solution to this problem.

Extension devices have been devised which extend to the finished surface of the new wall covering and thus, compensate for the installation of the new wall covering over the existing wall covering. One such extension device is shown, for example, in U.S. Pat. No. 3,878,315, issued Apr. 15, 1975 to Jerry F. Blush. Blush discloses an extension attachable to an electrical box. The extension is secured between the electrical box and the electrical device by the screws provided with the electrical device. The walls forming the extension coexist with the walls of the electrical box to which it is attached. This extension does not provide a seal with the electrical box. The extension may be disassembled and reassembled to fit electrical boxes of various sizes.

Another electrical box extension is shown in U.S. Pat. No. 2,378,861, issued Jun. 19, 1945 to Lafayette H. Peevey. The extension snugly telescopes within the electrical box. Central elongated slots are provided in the ends walls of the extension for receive the electrical box lugs. Removable sections are provided which enable the depth of the slots to be increased. This extension is limited in its application to the type of electrical box in which it may cooperatively engage.

Another telescoping electrical box extension is shown in U.S. Pat. No. 5,042,673 issued Aug. 27, 1991 to William J. McShane. McShane discloses an extension attachable to an existing electrical box so as to extend flush with a new wall surface or covering which has been applied over an existing wall surface or covering. The extension disclosed requires the use of depth adjustment screws and attachment bars to enable the electrical box extension to be mounted to an existing electrical box.

A telescoping electrical box is shown in U.S. Pat. No. 2,297,862, issued Oct. 6, 1942 to Walter H. Bachmann. Bachmann discloses an electrical box consisting of a first section and a second section slidably received by the first section. The first section includes an upper and lower ratchet surface. The second section includes an upper and lower tongue and pawl arrangement engageable with respective ratchet surfaces. The second section, or the telescoping section, limited in its application to the first section of the electrical box in which it is slidably received.

Other electrical box extensions are shown in U.S. Pat. No. 2,989,206, issued Jun. 20, 1961 to Robert F. McAfee, U.S. Pat. No. 3,525,450, issued Aug. 25, 1970 to Benjamin Payson, and U.S. Pat. No. 3,651,245, issued Mar. 21, 1972 to Oswin C. Moll. McAfee discloses an extension including a cover attachable to an electrical box. The cover has an opening therein through which a tunnel member telescopes. The tunnel member is composed of a plurality of breakaway sections which, upon removal, vary the tunnel member length. Payson and Moll each disclose an extension including a cover attachable to an electrical box. Each cover has an a sleeve or a tubular member secured thereto. Similar to McAfee, each sleeve is formed of a plurality of separable sections. Upon removal of a section, the sleeve length is shortened. Similar to that disclosed by McAfee, Payson, and Moll, is an electrical box assembly shown in U.S. Pat. No. 4,599,485, issued Jul. 8, 1986 to Robert A. Smolik. The assembly includes a tubular frame having flange members extending therefrom. The flange members cover portions of the electrical box opening not covered by the tubular frame.

In contrast to the foregoing inventions, an extension connector for an electrical box is shown in U.S. Pat. No. 3,689,864, issued Sep. 15, 1972 to James Glader, who describes an extension connector for an electrical outlet box. This extension connector is purposed to secure an electrical device flush with a new wall surface. This extension connector does not overcome a crucial problem. It does not isolate the electrical device from the environment surrounding the electrical box. A portion of the electrical device which extends between the new wall covering and the existing electrical box remains exposed.

An extension device which could be installed without removing a respective electrical device from its circuit, which could be secured to the electrical box by the same fasteners used to secure the electrical device flush with the surface of the new wall covering, and hence, which would require minimal installation effort, could prove to be invaluable.

None of the above inventions and patents, taken either singly or in combination, is seen to describe the instant invention as claimed.

SUMMARY OF THE INVENTION

The present invention is an extension device for use with existing electrical boxes. The extension device is adapted for use in mounting electrical devices flush with a finished surface of a new wall covering which has been installed over an existing wall covering. The extension device isolates the electrical device from the environment surrounding the electrical box.

The extension device is a substantially rectangular ring having peripheral walls approximating the dimensions of the peripheral walls of the existing electrical box. A peripheral flange extends inwardly and substantially perpendicularly from the four peripheral walls forming the rectangular ring. An upper and lower inwardly directed formation each extend from interiorly of a central point of the upper and lower peripheral walls forming the rectangular ring. Each formation constitutes a ferrule for receiving a threaded fastener therethrough.

The peripheral flanges are arranged and configured to abut the peripheral walls of the existing electrical box. This abutment isolates the electrical device and the electrical circuitry associated therewith within the extension and the existing electrical box. The abutment of the peripheral flanges and the peripheral walls of the existing electrical box further reduces the risk of fire hazard by isolating the electrical device and its associated electrical circuitry from the environment surrounding the extension device and the existing electrical box.

The inwardly directed formations are provided with openings which are arranged to coalign with the threaded apertures associated with the existing electrical box. The threaded apertures associated with the electrical box are arranged to receive the threaded fasteners associated with the electrical device. The threaded fasteners associated with the electrical device are intended to secure the electrical device to the existing electrical box. By removing the threaded fasteners, the electrical device may be passed through the extension device.

Subsequent to applying a new wall covering over an existing wall covering, the extension device is inserted into the hole provided in the surface of the new wall covering. The hole the surface of the new wall covering exposes the existing electrical box. Upon insertion of the extension device into the hole, the peripheral flanges abut the peripheral walls of the existing electrical box. This abutment isolates the electrical device and the electrical circuitry associated therewith from the surrounding environment thereof. With the extension device inserted into the hole and positioned adjacent to the existing electrical box, the electrical device may be secured flush with the finished surface of the new wall covering. This secures the extension device between the electrical device and the existing electrical box.

Note that the threaded fasteners which fasten the electrical device to the existing electrical box also secure the extension device in place. No additional hardware is required. Minimal installation effort is achieved.

Accordingly, it is a principal object of the invention to provide an extension device adapted for use in mounting electrical devices flush with a finished surface of a new wall covering which has been installed over an existing wall covering, and for isolating the electrical device from its surrounding environment.

It is another object that the extension device carrying dimensions approximating those of the existing electrical box.

It is a further object that the extension device abut the existing electrical box so as to isolate the electrical device and the electrical circuitry associated therewith from the surrounding environment thereof.

Still another object is that the extension device be installable without disconnecting the electrical device its associated electrical circuitry.

Another object is that the extension device be securable between the electrical device and the existing electrical box by the same threaded fasteners provided for fastening the electrical device to the existing electrical box, thus eliminating the need for additional hardware.

Yet, another object is that the extension device require a nominal amount of installation effort.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a front perspective view of an extension device according to the present invention.

FIG. 2 is a rear perspective view of the extension device shown in FIG. 1.

FIG. 3 is a front elevational view of the extension device.

Similar reference characters denote corresponding features consistently throughout the attached drawings.

DETAILED DESCRIPTION OF THE PREFERRED EMBODIMENTS

Figure 4:
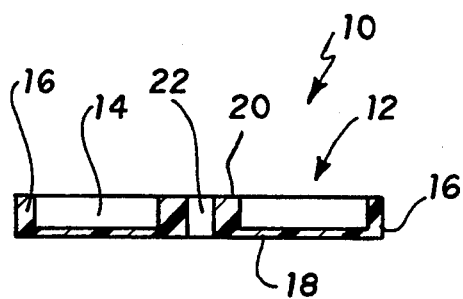
FIG. 4 is a cross-section of the extension device drawn along the line 4—4 of FIG. 3.
Figure 5:
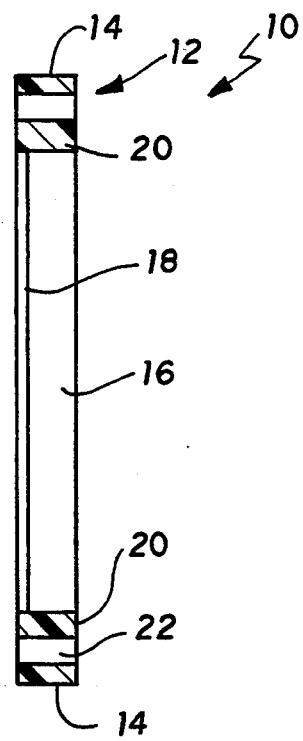
FIG. 5 is a cross-section of the extension device drawn along the line 5—5 of FIG. 3.
Figure 6:
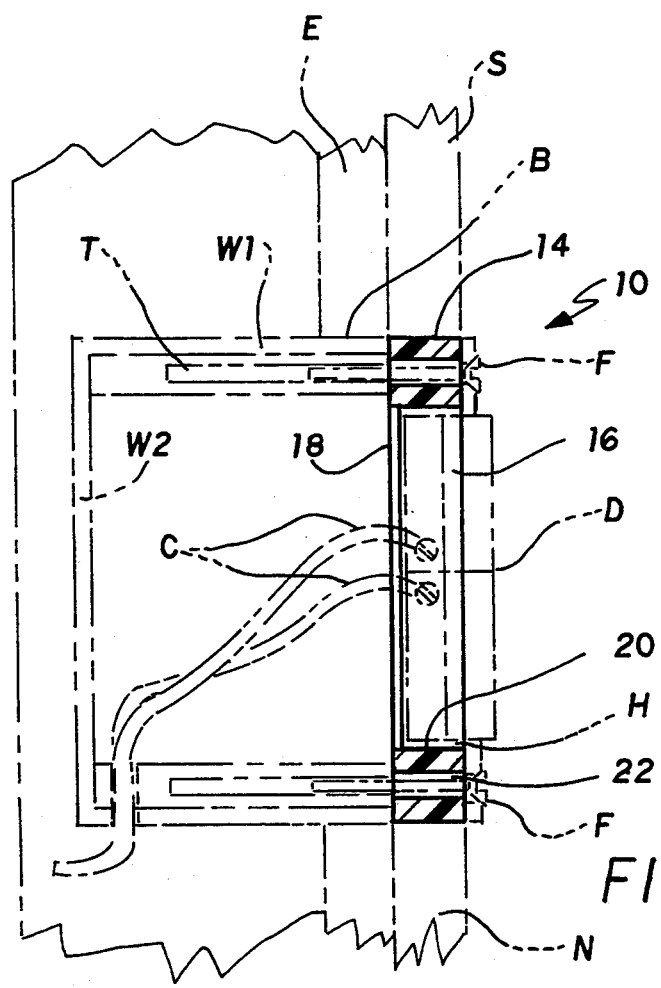
FIG. 6 is an environmental cross-sectional view of the extension device.

Now referring to the drawings and, more particularly to FIGS. 1-5, a novel extension device 10 is illustrated. The extension device 10 is comprised of a substantially rectangular ring 12 having peripheral walls 14, 16 carrying dimensions approximating the peripheral walls $W_1$, $W_2$ of an existing electrical box B, as is shown in FIG. 6. A peripheral flange 18 extends inwardly and substantially perpendicularly from the rearward most edge of the peripheral walls forming the rectangular ring 12. The right angle structure formed by the peripheral walls $W_1$, $W_2$ enhance the structural integrity of the ring 12. An upper and lower formation 20 each extend inwardly from a central point located interiorly of the upper and lower peripheral walls 14 of the rectangular ring 12. The extension device 10 is fabricated of non-conductive material, such as a molded plastic or a hardened rubber.

Figure 7:
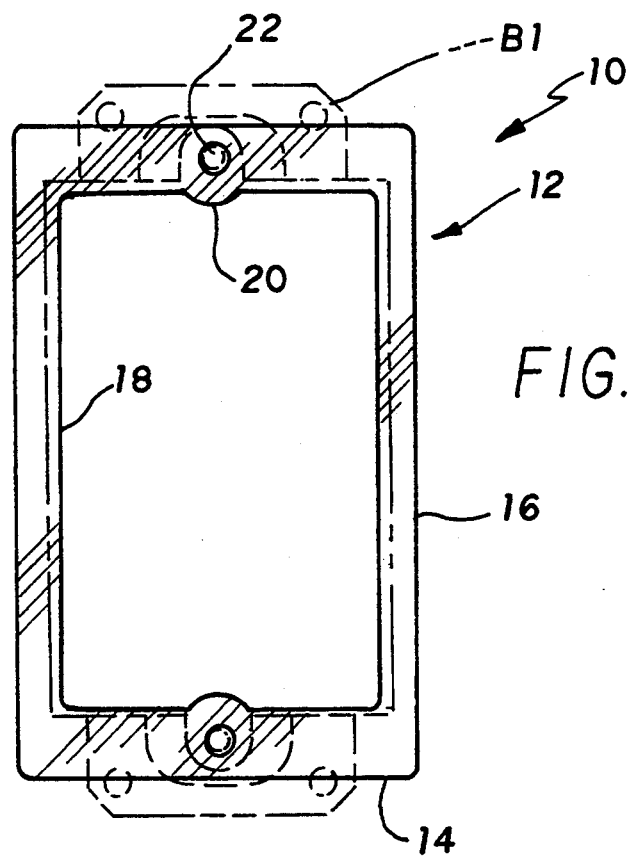
FIG. 7 is an environmental front elevational view of the extension device used with a metal single-gang box.
Figure 8:
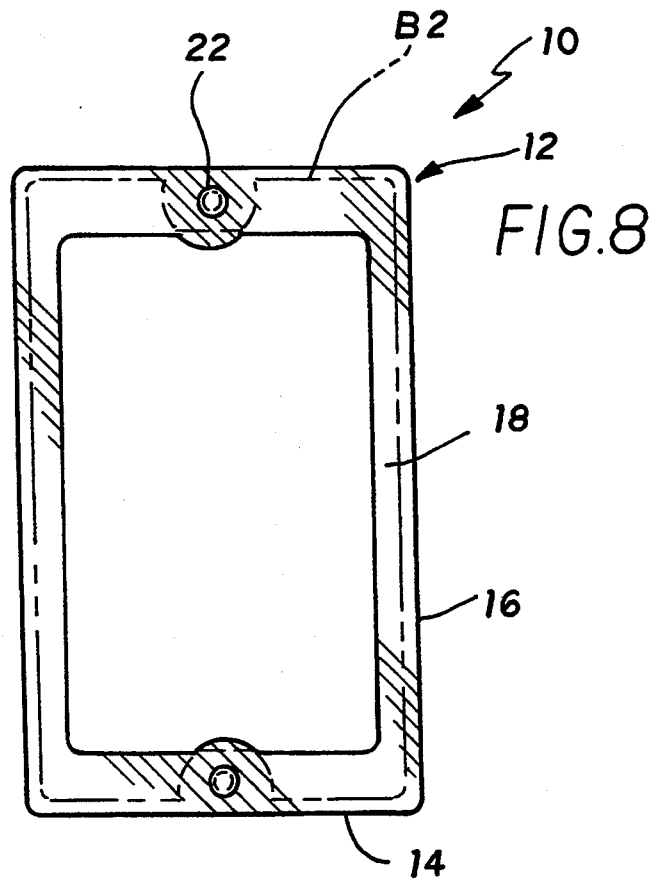
FIG. 8 is an environmental front elevational view of the extension device used with a plastic single-gang box.

As shown in FIG. 6, the extension device 10 is for use with existing electrical boxes B. The extension device 10 is for use in mounting electrical devices D flush with a finished surface S of a new wall covering N applied over an existing wall covering E. The extension device 10 isolates the electrical device D from its surrounding environment. The peripheral flange 18 is arranged and configured so as to abut the peripheral walls $W_1$, $W_2$ of the existing electrical box B. The inwardly directed peripheral flange 18 permits the same extension device 10 to abut the peripheral walls of existing electrical boxes of various types and configurations, such as the metal single-gang box B₁ shown in FIG. 7, and the plastic single-gang box B₂ shown in FIG. 8. In absence of the peripheral flange 18, the isolation of the electrical device D and its associated circuitry C could not be achieved with a single extension. A different extension would be required depending on the type and configuration of the box.

The inwardly directed formations 20 are provided with openings 22 so as to form ferrules. The openings 22 are oriented so as to be permitted to coalign with the threaded apertures T in the existing electrical box B. The threaded apertures T mate with threaded fasteners F which fasten the electrical device D to the existing electrical box B. By removing the threaded fasteners F from the threaded apertures T, the electrical device D may be passed through the extension device 10. The electrical device D may be passed through the extension device without disconnecting the associated circuitry C. Moreover, since the extension device 10 is fabricated of the nonconductive and noncombustible material, it reduces the risk of potential fire hazard and personal injury which may occur if the extension device 10 is installed without eliminating power from the electrical circuitry C.

After passing the electrical device D through the extension device 10, the extension device 10 may be inserted into the hole H formed in the new wall covering N in such a manner that the peripheral flange 18 abuts the existing electrical box B. Upon insertion of the extension device 10 into the hole H, as is shown in FIG. 6, the electrical device 10 may be secured flush with the finished surface S of the new wall covering N. In this way, the extension device 10 is sandwiched between the electrical device D and the existing electrical box B. The same threaded fasteners F which fasten the electrical device D to the existing electrical box B secure the extension device 10 against the electrical box B. It may be necessary to replace the original or existing fasteners F with longer fasteners, depending on the thickness of the new wall covering N and, likewise, the thickness of the extension device 10. Otherwise, no additional hardware is required. A minimal installation effort is achieved.

It should be understood that the extension device 10 can be dimensioned and configured to be used with a myriad of existing electrical boxes B, such as the 2×4 inch single-gang box shown or any of a number of multi-ganged boxes (i.e. 4×4 two-gang and 6×4 inch three-gang boxes). It should further be understood that the extension device 10 may be dimensioned so as to be useful in holes H of varying depth (i.e. ⅜, ½, ⅝, and ¾ inch deep holes). It should also be understood that the extension device 10 may be stackable. By stacking various extension devices 10, a desired extension may be achieved.

It is to be understood that the present invention is not limited to the sole embodiment described above, but encompasses any and all embodiments within the scope of the following claims.

I claim:

1. An extension for use with existing electrical boxes for mounting electrical devices flush with a finished surface of a new wall covering which has been applied over an existing wall covering and for insulating the electrical device from a surrounding environment, said extension comprising:

a ring having a plurality of peripheral walls, said peripheral walls having a rearward edge, and a forward edge, said peripheral walls being dimensioned and configured to extend between an existing electrical box and a finished surface of a new wall covering, and said rearward and forward edges having flat surfaces;

a peripheral flange extending inwardly and substantially perpendicularly from said rearward edge of said peripheral walls, said flange having a flat rearward surface;

a plurality of ferrules integral with and extending inwardly from said peripheral walls of said ring, and extending from said forward edge to said rearward edge of said peripheral walls, each ferrule having an opening passing therethrough;

said openings being arranged so as to align with threaded apertures in the existing electrical box, the threaded apertures being threadably engageable with threaded fasteners which fasten the electrical device to the existing electrical box, and said openings in said ferrules having a diameter greater than that of the threaded fastener; whereby said electrical device is mounted flush with a surface of a new wall covering, securing said extension between the electrical device and the existing electrical box.

2. The extension according to claim 1, wherein said ring is substantially rectangular in shape, having dimensions substantially equivalent to that of a front end of an existing electrical box.

3. The extension according to claim 2, wherein said substantially rectangular ring includes upper and lower peripheral walls, and side peripheral walls.

4. The extension according to claim 3, wherein two ferrules are integral with said peripheral walls, one of said two ferrules extending from said upper peripheral wall, the other of said two ferrules extending from said lower peripheral wall.

5. The extension according to claim 4, wherein said extension is fabricated from a non-conductive material.

6. The extension according to claim 5, wherein said extension is fabricated from a molded plastic material.

7. The extension according to claim 6, wherein said extension is fabricated from a hardened rubber material.

* * * * *